United States Patent [19]

Arend et al.

[11] Patent Number: 5,204,409

[45] Date of Patent: Apr. 20, 1993

[54] CROSSLINKING AGENTS FOR POLYMERIC ADHESIVES

[75] Inventors: Günter Arend, Dormagen; Otto Ganster, Odenthal; Rudolf Hombach, Leverkusen; Horst Müller-Albrecht, Cologne; Knut Panskus, Wermelskirchen, all of Fed. Rep. of Germany

[73] Assignee: Bayer Aktiengesellschaft, Leverkusen, Fed. Rep. of Germany

[21] Appl. No.: 832,262

[22] Filed: Feb. 7, 1992

[30] Foreign Application Priority Data

Feb. 14, 1991 [DE] Fed. Rep. of Germany ........ 4104436

[51] Int. Cl.$^5$ .............................................. C08L 75/04
[52] U.S. Cl. .................... 525/123; 525/129; 525/130; 524/552; 524/575.5; 524/589; 524/590; 528/67; 252/182.21
[58] Field of Search ............. 525/123, 129, 130; 524/552, 575.5, 589, 590; 156/331.1, 331.4; 528/67; 252/182.21

[56] References Cited

U.S. PATENT DOCUMENTS

| | | | |
|---|---|---|---|
| 3,505,105 | 4/1970 | Macfarlane et al. | 117/138.8 |
| 4,255,569 | 3/1981 | Müller et al. | 544/193 |

FOREIGN PATENT DOCUMENTS

| | | |
|---|---|---|
| 2242161 | 3/1974 | Fed. Rep. of Germany . |
| 3717070 | 12/1988 | Fed. Rep. of Germany . |
| 1393587 | 5/1975 | United Kingdom . |

OTHER PUBLICATIONS

World Patents Index Week 37, 1975, AN 75-61716W & SU-433 196 (Vinogradova) Dec. 15, 1974.

*Primary Examiner*—Maurice J. Welsh
*Attorney, Agent, or Firm*—Joseph C. Gil; Godfried R. Akorli

[57] ABSTRACT

The invention relates to crosslinking isocyanates for polymeric adhesives containing a mixture of triisocyanatotriphenyl methane and trimerization products of 2,4-tolylene diisocyanate containing at least 50% triisocyanatomonoisocyanurate and less than 1% free tolylene diisocyanate.

8 Claims, No Drawings

CROSSLINKING AGENTS FOR POLYMERIC ADHESIVES

BACKGROUND OF THE INVENTION

This invention relates to crosslinking isocyanates for polymeric adhesives. Crosslinking additives, preferably for solvent-containing adhesives based on natural or synthetic polymers, include a number of trifunctional or higher polyisocyanates, for example 4,4',4"-triisocyanatotriphenyl methane, isocyanatoaryl phosphoric acid or thiophosphoric acid derivatives according to DE-PS 1,311,001 (for example thiophosphoric acid tris-(p-isocyanatophenyl ester)), substituted diphenyl methane tetraisocyanates according to DE-PS 1,812,565 or NCO-terminated reaction products of 2,4-tolylene diisocyanate with trimethylol propane. Other crosslinking isocyanates based on 2,4-tolylene diisocyanates are isocyanate-functional trimers of the type described, for example, in DE-PS 2,641,380.

The use of the polyisocyanates mentioned as crosslinking additives increases, above all, the heat resistance of the adhesive bond. For the purpose of arresting the elastic recovery forces, an adhesive film of high instant strength is required for the bonding of substrates under tension, for example in the bonding of shoe soles to highly curved upper parts or in the lamination of highly structured supporting components with preheated, i.e. softened, plastic films by vacuum forming.

Although some of these polyisocyanates, for example 4,4',4"-triisocyanatotriphenyl methane or the triisocyanatomonoisocyanurates according to DE-PS 2,641,380, do give extremely good instant strength values, a further improvement in this property would afford considerable technical advantages by enabling the cycle times to be shortened.

The present invention relates to mixtures of trimers of 2,4-tolylene diisocyanate with triisocyanatotriphenyl methane (4,4',4"-triisocyanatotriphenyl methane) as crosslinking isocyanates for polymeric adhesives which, compared with the already very effective individual components, surprisingly show both a distinctly improved instant strength in the peel test and also a distinct improvement in bond strength as measured in the presence of heat.

SUMMARY OF THE INVENTION

The present invention encompasses a crosslinking agent for polymeric adhesives, comprising a mixture of A) 4,4',4"-triisocyanatotriphenyl methane and B) trimerization products of 2,4-tolylene diisocyanate containing at least 50% by weight triisocyanatomonoisocyanurate and less than 1% free tolylene diisocyanate. Further encompassed by the claimed invention is the adhesives prepared by combining the crosslinking agents with adhesive polymers such as natural or synthetic rubbers, hydroxyl polyurethanes or chloroprenes. Also encompassed by the invention is a process for bonding substrates such as rubber, leather, plastics or metals, using the adhesives of the claimed invention. The bonded substrates which can be of the same or different substrates which are prepared by the process of the claimed invention are also encompassed.

DETAILED DESCRIPTION OF THE INVENTION

Triisocyanatotriphenyl methane products (for example solutions in ethyl acetate) may be used. Products which contain more than 50% by weight triisocyanatomonoisocyanurate which should contain no more than 1% free monomeric tolylene diisocyanate, as described in DE-PS 2,641,380, are used as the trimerization product of 2,4-tolylene diisocyanate.

Triphenylmethane triisocyanate (A) and the trimerization product (B) are used in the mixtures according to the invention in ratios by weight of A to B of 4.37:1 to 0.136:1 and preferably 2.31:1 to 0.257:1.

The use of the isocyanate mixtures in accordance with the invention is directed to the crosslinking of polymeric adhesives, more particularly those based on natural and synthetic rubber. The adhesives are preferably solvent-containing adhesives.

Examples of suitable synthetic rubbers are polymers of dienes, such as butadiene, with monoolefinically unsaturated compounds such as for example styrene, acrylonitrile, methacrylonitrile or other vinyl derivatives, polyhydroxypolyethers or polyhydroxypolyesters or polyurethanes produced therefrom or polymers or copolymers of 2-chloro-1,3-butadiene with other polymerizable olefinically unsaturated monomers. Preferred polymers for the adhesives are the last-mentioned polymers or copolymers of 2-chloro-1,3-butadiene, especially linear or substantially linear hydroxyl polyurethanes which have been produced from esters of aliphatic or aromatic dicarboxylic acids with alkane-diols or lactones, more particularly caprolactone, and aromatic or aliphatic diisocyanates, more particularly diisocyanatotoluenes, 4,4'-diisocyanatodiphenyl methane or hexamethylene diisocyanate.

Depending on the basic polymer, suitable solvents for these adhesives are inter alia aliphatic hydrocarbons, for example gasoline; aromatic hydrocarbons, for example toluene; chlorinated hydrocarbons, for example methylene chloride, trichloroethylene; ketones, such as for example acetone, methyl ethyl ketone; carboxylic acid esters, such as for example ethylacetate or mixtures of these solvents.

In addition to the polymeric binders, the adhesives may contain other substances, for example natural resins, modified natural resins (for example colophony esters), or synthetic resins (for example phthalate resins) or even other polymers, such as chlorinated rubber for example, or soluble polymers or copolymers of vinyl acetate or other vinyl compounds, to modify their adhesive properties, for example to obtain particularly long-lasting contact tackiness or to increase cohesive strength.

In their use in accordance with the invention, the isocyanate mixtures are preferably used in a quantity of 3 to 35 parts by weight and preferably 6 to 20 parts by weight, based on 100 parts by weight adhesive polymer. To ensure rapid and homogeneous distribution, it is best to add the isocyanate mixtures according to the invention in the form of 10 to 50% by weight solutions in suitable solvents to the adhesive polymers which, in turn, are generally used in the form of 10 to 30% solutions. Suitable solvents are, for example, dichloromethane, ethyl acetate.

The adhesives crosslinked with the isocyanate mixtures according to the invention are suitable for bonding materials of the same kind or of different kinds, for example leather, textiles, plastics, metals or wood, preferably flexible polyvinyl chloride materials and rubber.

The invention is illustrated by the following Examples.

EXAMPLES

1. Products used
    1.1 Constituents of the crosslinking isocyanate mixture
        A: 4,4',4''-triisocyanatotriphenyl methane, 27% solution in ethyl acetate, isocyanate content of the solution: 9.3%
        B: trimerization product of 2,4-tolylene diisocyanate containing approx. 60% triisocyanatomonoisocyanurate according to DE-PS 26 41 380 in the form of a 35% solution in ethyl acetate; isocyanate content of the solution 7%

|  | Solution | Solids |
|---|---|---|
| Example 1 (Comparison Example) | A + B = 0 + 100 = | 35 parts by weight |
| Example 2: | A + B = 15 + 85 = | 4.05 + 29.75 parts by weight |
| Example 3: | A + B = 25 + 75 = | 6.75 + 26.25 parts by weight |
| Example 4: | A + B = 50 + 50 = | 13.50 + 17.50 parts by weight |
| Example 5: | A + B = 75 + 25 = | 20.25 + 8.75 parts by weight |
| Example 6: | A + B = 85 + 15 = | 22.9 + 5.25 parts by weight |
| Example 7: (Comparison Example) | A + B = 100 + 0 = | 27 parts by weight |
| Examples 8–14: as Examples 1–7 | | |
| Examples 15–21: as Examples 1–7 | | |
| Examples 22–28: as Examples 1–7 | | |

1.2 Adhesives
    Solutions of hydroxyl polyurethanes in methyl ethylketone. The hydroxyl polyurethanes used may be produced by the methods described for example in DE-OS 3 717 070.
        Examples 1–14: Hydroxyl polyurethane HI.
        Composition of HI: Reaction product of an ester diol based on adipic acid and butanediol (Mw=2,250) with 2,4-tolylene diisocyanate; NCO:OH ration 0.99.
        Examples 15–28: Hydroxyl polyurethane H2.
        Composition of H2: Reaction product of an ester diol based on adipic acid and ethanediol (Mw=2,000) with 2,4-tolylene diisocyanate; NCO:OH ratio 0.99.
        Concentration of the solutions of HI and H2 in methyl ethyl ketone: 20% by weight 1.3 Substrates to be bonded
    P: PVC plasticized with 30% by weight dioctyl phthalate for Examples 1–7
    N: Nora test rubber (SBR) test substrate of the PFI (Pirmasens)manufacturer: Carl Freudenberg, Weinheim, FRG, for Examples 8–14, 15–21, 22–28.

2. Production of the crosslinking isocyanate/adhesive solution: x parts by weight of the solutions of the crosslinking isocyanates are homogeneously stirred into 100 g of the 20% by weight solutions of hydroxyl polyurethanes H1 and H2.

| Examples 1–14: | 100 parts by weight solution H1 |
| | 5 parts by weight crosslinking isocyanate solutions |
| Examples 15–21: | 100 parts by weight solution H2 |
| Examples 22–28: | 5 parts by weight crosslinking isocyanate solutions |
| | 100 parts by weight solution H2 |
| | 10 parts by weight crosslinking isocyanate solutions |

These solution-based mixing ratios correspond to the following solids ratios:

| Examples | Hydroxyl polyurethane (solid) (parts by weight) | Isocyanate (solid) (parts by weight) |
|---|---|---|
| 1, 8, 15 | 100 | 8.75 |
| 2, 9, 16 | 100 | 8.45 |
| 3, 10, 17 | 100 | 8.25 |
| 4, 11, 18 | 100 | 7.25 |
| 5, 12, 19 | 100 | 7.50 |
| 6, 13, 20 | 100 | 7.05 |
| 7, 14, 21 | 100 | 6.75 |
| 22 | 100 | 17.5 |
| 23 | 100 | 16.9 |
| 24 | 100 | 16.5 |
| 25 | 100 | 15.5 |
| 26 | 100 | 15.0 |
| 27 | 100 | 14.1 |
| 28 | 100 | 13.5 |

3. Application of the crosslinking isocyanate/adhesive solution
    The crosslinking isocyanate/adhesive mixture prepared as described in 2. is applied to the substrate by brush in a thickness of approx. 20 to 30 g/m$^b$ 2.

4. Bonding procedure
    Bonding is carried out in accordance with DIN 53 273, the adhesive being applied to both substrate surfaces to be bonded. Heat activation (temperature of the adhesive film: approx. 80° C.) is only carried out on one of the two substrate surfaces to be bonded. Within 10 seconds of their removal from the activation unit, the two surfaces to be bonded are placed on one another and subjected to a pressure of 0.4 N/mm$^2$.

5. Testing
    Bond strength is determined by the peel test according to DIN 53 273 (peeling resistance).
    Examples 1–14: Measurement immediately after bonding.
    Examples 15–28: After bonding, cure for one hour at 50° C. and carry out peel test immediately, i.e. without cooling.

6. Results of the measurements
    Examples 1–14
        Adhesive polymer: hydroxyl polyurethane H1.
        Measured quantity: peel strength immediately after bonding.
        Dimension: N/mm.

| Example | Ratio of isocyanates A:B (solids) | Ratio of H1 to isocyanate (solids) | Substr. | Peel strength immediately after bonding |
|---|---|---|---|---|
| 1 Comp. | 100% B | 100: 8.75 | N | 2.3 |
| 2 | 0.136:1 | 8.45 | N | 2.3 |
| 3 | 0.275:1 | 8.25 | N | 2.6 |
| 4 | 0.771:1 | 7.75 | N | 3.0 |
| 5 | 2.314:1 | 7.50 | N | 2.1 |
| 6 | 4.371:1 | 7.05 | N | 1.7 |
| 7 Comp. | 100% A | 6.75 | N | 1.7 |
| 8 Comp. | 100% B | 100: 8.75 | P | 1.3 |

-continued

| Example | Ratio of isocyanates A:B (solids) | Ratio of H1 to isocyanate (solids) | Substr. | Peel strength immediately after bonding |
|---|---|---|---|---|
| 9 | 0.136:1 | 8.45 | P | 1.7 |
| 10 | 0.257:1 | 8.25 | P | 2.0 |
| 11 | 0.771:1 | 7.75 | P | 3.6 |
| 12 | 2.314:1 | 7.50 | P | 3.2 |
| 13 | 4.371:1 | 7.05 | P | 1.0 |
| 14 Comp. | 100% A | 6.75 | P | 1.0 |

Examples 15-28

Adhesive polymer: hydroxyl polyurethane H2.
Measured quantity: peel strength after curing for 1 hour at 50° C. without cooling.
Dimension: N/mm.

| Example | Ratio of isocyanates A:B (solids) | Ratio of H2 to isocyanate (solids) | Substr. | Peel strength immediately after 1 h cure at 50° C. (without cooling |
|---|---|---|---|---|
| 15 Comp. | 100% B | 100: 8.75 | N | 1.0 |
| 16 | 0.136:1 | 8.45 | N | 1.1 |
| 17 | 0.257:1 | 8.25 | N | 1.1 |
| 18 | 0.771:1 | 7.75 | N | 1.5 |
| 19 | 2.314:1 | 7.50 | N | 1.6 |
| 20 | 4.371:1 | 7.05 | N | 1.1 |
| 21 Comp. | 100% A | 6.75 | N | 1.0 |
| 22 Comp. | 100% B | 100: 17.5 | N | 1.1 |
| 23 | 0.136:1 | 16.9 | N | 1.0 |
| 24 | 0.257:1 | 16.5 | N | 1.4 |
| 25 | 0.771:1 | 15.5 | N | 2.0 |
| 26 | 2.314:1 | 15.0 | N | 1.4 |
| 27 | 4.371:1 | 14.1 | N | 1.5 |
| 28 Comp. | 100% A | 13.5 | N | 1.2 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A crosslinking agent for polymeric adhesives comprising a mixture of
   A) 4,4',4''-triisocyanatotriphenyl methane and
   B) trimerization products of 2,4-tolylene diisocyanate containing at least 50% by weight triisocyanatomonoisocyanurate and less than 1% by weight free tolylene diisocyanate.

2. A crosslinking agent as claimed in claim 1, characterized in that isocyanates A and B are in a mixing ratio of A to B of 4.37:1 to 0.136:1 parts by weight of solid material of the isocyanates in solution in inert solvents.

3. A crosslinking agent as claimed in claim 1, characterized in that isocyanates A and B are in a mixing ratio of A to B of 2.31 : 1 to 0.257 : 1 parts by weight of solid material of the isocyanates in solution in inert solvents.

4. A crosslinking agent as claimed in claim 1, characterized in that the isocyanate mixture is in an amount of 3 to 25 parts by weight based on 100 parts by weight of the adhesive polymer.

5. A crosslinking agent as claimed in claim 1, characterized in that the isocyanate mixture is in an amount of 6 to 20 parts by weight, based on 100 parts by weight of the adhesive polymer.

6. An adhesive comprising a crosslinking agent as claimed in claim 1, in combination with an adhesive polymer selected from the group consisting of natural and synthetic rubbers.

7. A process for bonding substrates comprising applying to the surface of at least one of the substrates an adhesive as claimed in claim 1 and contacting said surface with the surface of another substrate to which the adhesive is optionally applied.

8. A process for bonding substrates as claimed in claim 1 wherein the substrates are selected from the group consisting of rubber, leather, plastic and metals.

* * * * *